(12) United States Patent
Lee et al.

(10) Patent No.: US 6,358,464 B1
(45) Date of Patent: Mar. 19, 2002

(54) METHOD FOR MAKING BATIO$_3$-BASED DIELECTRIC

(75) Inventors: Byung Kee Lee; Yang Il Jung, both of Daejeon Kwangyeok-si; Ho Yong Lee, Choongchungnam-do; Suk-Joong Kang, Daejeon Kwangyeok-si; Sung Yoon Chung, Seoul, all of (KR)

(73) Assignee: Korea Advanced Institute of Science and Technology, Kwangyeok-Si (KR)

( * ) Notice: Subject to any disclaimer, the term of this patent is extended or adjusted under 35 U.S.C. 154(b) by 0 days.

(21) Appl. No.: 09/693,930

(22) Filed: Oct. 23, 2000

(30) Foreign Application Priority Data

Mar. 4, 2000 (KR) .......................................... 2000-10895

(51) Int. Cl.$^7$ ............................................. C04B 33/32
(52) U.S. Cl. ....................................... 264/674; 264/681
(58) Field of Search ................................ 264/674, 681; 156/89.14

(56) References Cited

U.S. PATENT DOCUMENTS 4,981,633 A * 1/1991 Alles et al.
5,523,065 A * 6/1996 Stangle et al. ................. 423/71

* cited by examiner

Primary Examiner—Christopher A. Fiorilla
(74) Attorney, Agent, or Firm—Rosenberg, Klein & Lee

(57) ABSTRACT

A method for making a BaTiO$_3$-based dielectric having a high dielectric constant and a low dielectric loss wherein, a BaTiO$_3$-based body is subjected to a pre-heat treatment in a hydrogen (H$_2$) atmosphere or a reducing atmosphere containing mixed gas of hydrogen and nitrogen in a ratio of hydrogen:nitrogen=5 to 100%:0 to 95% prior to a sintering process in the manufacture of dielectrics, in order to obtain a reduced average grain size of BaTiO$_3$. By virtue of the reducing average grain size of BaTiO$_3$, a BaTiO$_3$-based dielectric having a high dielectric constant and a low dielectric loss is obtained. This method provides an advantage in that it is possible to make a BaTiO$_3$-based dielectric having a very small average grain size while having a high relative density in accordance with a simple heat treatment conducted for pure BaTiO$_3$ or even for BaTiO$_3$ added with an additive in a reducing atmosphere at a temperature less than a liquid phase forming temperature, prior to a sintering process for sintering the BaTiO$_3$.

5 Claims, 2 Drawing Sheets

METHOD FOR MAKING BATIO$_3$-BASED DIELECTRIC

BACKGROUND OF THE INVENTION

1. Field of the Invention

The present invention relates to a method for making a BaTiO$_3$-based dielectric having a high dielectric constant and a low dielectric loss, and more particularly to a method for making a BaTiO$_3$-based dielectric having a high dielectric constant and a low dielectric loss, in which a BaTiO$_3$-based body is subjected to a pre-heat treatment in a hydrogen (H$_2$) atmosphere or a reducing atmosphere containing mixed gas of hydrogen and nitrogen in a ratio of hydrogen:nitrogen=5 to 100%: 0 to 95% prior to a sintering process in the manufacture of dielectrics, in order to obtain a reduced average grain size of BaTiO$_3$.

2. Description of the Related Art

It has been reported that in a BaTiO$_3$ system, a small number of grains are abruptly grown in an abnormal fashion at a temperature in the vicinity of 1,332° C. while consuming grains of a small grain size on the matrix (Y. Matsuo and H. Sasaki, J. Am, Ceram. Soc., 54[9] p471(1971); D. Hennings, Sci. Ceram., 12, p405(1984); D. Kolar, p529 in Ceramic Transaction, Vol. 7, Sintering of Advanced Ceramics. Edited by C. A. Handwerker, J. E. Blendell and W. A. Kaysser. American Ceramic Society, Westerville, Ohio, (1990); P. R. Rios, T. Yamamoto, T. Kondo, and T. Sakuma, Acta Metall. Mater., 46[5] p1617 (1998); H. Schmelz and A. Meyer, Ceram. Forum Int., Ber. Dtsch. Keram. Ges., 59[8/9] p436 (1982); H. Schmelz, Ceram. Forum Int., Ber. Dtsch. Keram. Ges., 61[4/5] p199(1984)).

Such an abnormal grain growth in a BaTiO$_3$ system results in an abrupt increase in the average grain size of a BaTiO$_3$-based sintered body produced using the BaTiO$_3$ system. Due to such an abnormal grain growth in the sintered body, air pores present at grain boundaries in that sintered body are rendered to be combined together, thereby expanding the grains of the sintered body to increase the volume of those grains. As a result, a decrease in sintering density occurs (Marlyse Demartin, Claude Herard, Claude Carry, and Jacques Lemaitre, J. Am. Ceram. Soc., 80 [5] p79 (1977)). For this reason, in order to obtain a BaTiO$_3$-based sintered body having a high relative density and a low average grain size, the above mentioned abnormal grain growth should be suppressed.

It is known that BaTiO$_3$ exhibits superior dielectric characteristics when it has an average grain size of 0.8 to 1.6 $\mu$m (K. Kinoshita, and A. Yamaji, J. Appl. Phys., 47(1) p371 (1976); G. Arlt, D. Hennings, and G. de with, J. Appl. Phys., 58(4), p1619(1985)).

Various methods have been proposed to make a BaTiO$_3$-based sintered body which has a reduced average grain size of BaTiO$_3$ to exhibit superior dielectric characteristics. In order to reduce the average grain size of the BaTiO$_3$ system, it is necessary to suppress an abnormal grain growth in the BaTiO$_3$ system or to increase the number of nuclei in abnormal grains. The method of suppressing an abnormal grain growth in the BaTiO$_3$ system is typically implemented by the addition of an additive. It has been reported that such an additive may include ZrO$_2$, Dy$_2$O$_3$, or Nb$_2$O$_5$ (T. R. Armstrong, L. E. Morgens, A. K. Maurice, and R. C. Buchanan, J. Am. Ceram. Soc., 72(4) p605(1989); A. Yamaji, Y. Enomoto, K. Kinoshita, and T. Murakani, J. Am, Ceram. Soc., 60(3–4) p108(1977); M. Kahn, J. Am. Ceram. Soc., 54(9) p452(1971)). However, this method cannot be used for BaTiO$_3$ added with an acceptor additive because materials proposed as an additive for suppressing an abnormal grain growth are neutral additives (ZrO$_2$) or donor additives (Dy$_2$O$_3$ and Nb$_2$O$_5$). Although it is necessary to add an additive in an excessive amount for an effective suppression of an abnormal grain growth, such an excessive addition of the additive may cause a variation in the electrical characteristics of pure BaTiO$_3$. For this reason, the above mentioned method has a limited application.

It is also known that it is possible to reduce the average grain size of the sintered body by increasing the number of nuclei in abnormal grains. For the method of increasing the number of nuclei in abnormal grains, there are a fast firing method, in which a sample is sintered at a temperature in the vicinity of 1,460° C. higher than a sintering temperature ranging from 1,340° C. to 1,380° C., and a method in which SiO$_2$ or TiO$_2$ serving to promote a creation of nuclei in abnormal grains is added ((H. Mostaghaci and R. J. Brook, J. Br. Ceram. Soc., 82[5] p167(1983); M. P. Harmer and R. J. Brook, J. Br. Ceram. Soc., 80[5] p147(1981); D. Kolar, p529–45 in Ceramic Transaction, vol 7, Sintering of Advanced Ceramics. Edited by C. A. Handwerker, J. E. Blendell and W. A. Kaysser, American Ceramic Society, Westerville, Ohio, (1990); C. Eastman, C. A. Elyard, and D. Warren, Proc. British Ceram. Soc., 18(1970)). However, the fast firing method is unsuitable for practical applications because it is conducted at a temperature in the vicinity of 1,460° C. very higher than a typical sintering temperature ranging from 1,340° C. to 1,380° C. This method has a drawback in that when SiO$_2$ or TiO$_2$ serving to promote a creation of nuclei in abnormal grains is added, a Ti-rich liquid phase is formed, thereby causing the electrical property of the sintered body to be degraded.

For another grain size adjusting method, there is a hot isostatic pressing method (G. Tomandl, A Stiegelschmitt, and K. Bermuth, CFI-Ceram. Forum Int. -BER. Dtsch. Keram. Ges., 64 [10] p389(1987); K. Oonish, T. Morohashi and K. Uchino, Nippon Seramikkusu Kyokai Gakujutsu Ronbunshi, 97 [4] p473 (1989)). This hot isostatic pressing method is effective in that a reduced sintering temperature can be used. However, it is difficult for this method to be applied to a practical component manufacture because the process used is expensive and complex.

The inventors made active research to solve the above mentioned problems. After such active research, the inventors has developed a process capable of increasing the relative density of a sintered body while reducing the average grain size of the sintered body in accordance with a pre-heat treatment conducted in a reducing atmosphere prior to a sintering process.

SUMMARY OF THE INVENTION

Therefore, an object of the invention is to provide a method for making a BaTiO$_3$-based dielectric having a very small average grain size while having a high relative density in accordance with a simple heat treatment conducted for BaTiO$_3$ including pure BaTiO$_3$ or BaTiO$_3$ added with an additive in a reducing atmosphere at a temperature less than a liquid phase forming temperature, prior to a sintering process for sintering the BaTiO$_3$.

In accordance with the present invention, this object is accomplished by providing a method for making a BaTiO$_3$-based dielectric, comprising the steps of: preparing BaTiO$_3$ powder for raw powder; molding the raw powder, thereby producing a powder compact body; subjecting the powder compact body to a pre-heat treatment in a reducing atmosphere; and sintering the powder compact body subjected to the pre-heat treatment.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE PREFERRED EMBODIMENTS

Figure 1:
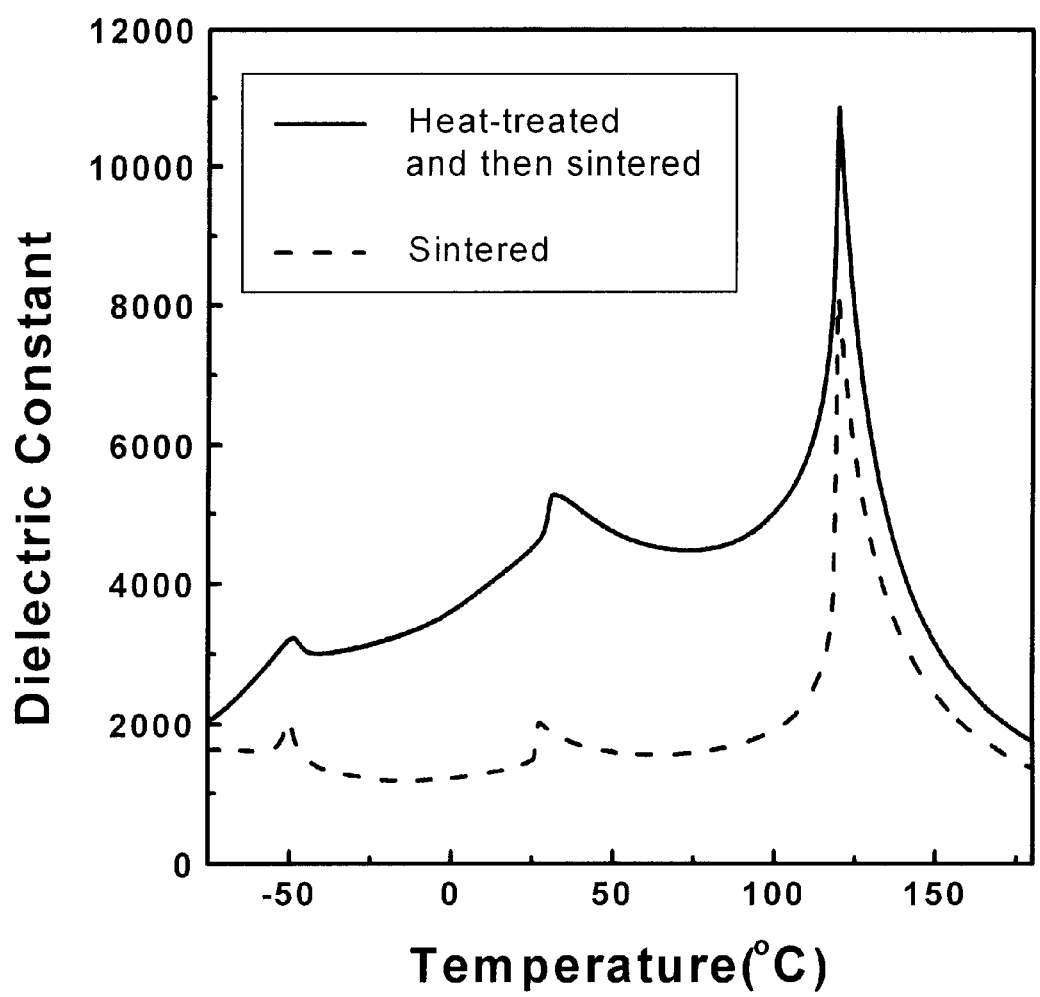
FIG. 1 is a graph depicting the dielectric constant of a dielectric made in accordance with the present invention, as compared to that of a conventional dielectric.

The present invention provides a method for making a $BaTiO_3$-based dielectric having a very small average grain size while having a high relative density. In accordance with the method of the present invention, raw powder to be used for the production of a $BaTiO_3$-based dielectric is first prepared. The raw powder includes $BaTiO_3$ powder, and preferably $BaTiO_3$ powder mixed with $TiO_2$. The prepared raw powder is then wet-mixed with $ZrO_2$ balls in an alcohol solvent for 2 to 48 hours. The resultant mixture is dried, milled, and sieved. The resultant product is charged into a metal mold so that it is molded. The molded body is then subjected to a cold isostatic pressing (CIP) process under a pressure of 170 to 230 MPa, thereby forming a powder compact body.

The powder compact body formed in accordance with the CIP process is then subjected to a pre-heat treatment in a high-temperature furnace using a heating element. The pre-heat treatment is carried out in a hydrogen ($H_2$) atmosphere, preferably a reducing atmosphere containing mixed gas of hydrogen and nitrogen in a ratio of hydrogen: nitrogen=5 to 100%: 0 to 95%, at a temperature less than a liquid phase forming temperature, preferably a temperature of 1,220 to 1,280° C., for 2 to 15 hours. Following the pre-heat treatment, the powder compact body is sintered in the atmosphere at a temperature of 1,320 to 1,380° C. for 2 to 100 hours, preferably 5 to 48 hours.

The present invention will now be described in detail with reference to the following example, comparative example, and test example, but the present invention is not to be construed as being limited thereto because the same pre-heat treatment and sintering processes can be used in sintering $BaTiO_3$-based bodies of different compositions, irrespective of whether or not $TiO_2$ or other additive is added.

EXAMPLE

For raw powder, $BaTiO_3$ powder and $TiO_2$ powder were prepared. The $BaTiO_3$ powder is a product "HPBT-1" manufactured by Fuji Titanium Company, Ltd. and has an average grain size of 0.5 $\mu$m, a Ba/Ti ratio of 0.994, and a purity of 99.98% or more while containing SrO, $Al2O_3$, and $SiO_2$ as major impurities thereof. The $TiO_2$ powder is a product manufactured by Aldrich Company and has a purity of 99.99% and an average grain size of 0.3 $\mu$m. The prepared $BaTiO_3$ powder and $TiO_2$ powder were added in an excessive amount of 0.4 mol % in an alcohol solvent contained in a polyethylene bottle, along with $ZrO_2$ balls. A wet mixing of the powder was carried out for 24 hours. The resultant mixture was dried, milled, and sieved using a maneuvering sieve. The resultant product was charged into a metal mold so that it is molded into a disc body having a diameter of 9 mm and a thickness of 5 mm. The molded body was then subjected to a CIP process under a pressure of 200 MPa, thereby forming a powder compact body.

The powder compact body formed in accordance with the CIP process was then subjected to a pre-heat treatment in a vertical tube-shaped furnace using a $MoSi_2$(Kanthal Super 1800) heating element. The pre-heat treatment was carried out in a hydrogen ($H_2$) atmosphere at a temperature of 1,250° C. for 10 hours. Following the pre-heat treatment, the powder compact body was sintered in the atmosphere at a temperature of 1,350° C. for 48 hours.

Thereafter, the disc sample obtained after the pre-heat treatment and sintering process was cut in a direction perpendicular to the flat surface thereof, and then roughly polished under the condition in which the cut disc sample was mounted using "Homica" (unsaturated polyester resin). Subsequently, the disc sample was polished using diamond abrasives in the order of 15 $\mu$m, 6 $\mu$m, 3 $\mu$m, and 1 $\mu$m. Finally, the resultant disc sample was finely polished using an $SiO_2$-suspension. The finely polished sintered sample was then chemically etched for 5 seconds in a $95H_2O$—$4HCl$—$1HF$(vol %) solution.

Comparative Example

A $BaTiO_3$-based sintered body was made using the same method as that of Example, except that the pre-heat treatment was conducted in a hydrogen (H2) atmosphere at 1,250° C. for 10 hours.

Test Example

Respective relative densities of the $BaTiO_3$-based sintered bodies manufactured in Example and Comparative Example were measured in accordance with the ASTM C373-72 standard. Also, respective average grain sizes of the $BaTiO_3$-based sintered bodies were measured using an image analyzer. The measurement results are described in the following Table 1. For the $BaTiO_3$-based sintered bodies, variations in dielectric constant and dielectric loss depending on a variation in temperature were also measured. In order to measure variations in dielectric constant and dielectric loss, each the $BaTiO_3$-based sintered body was sufficiently cooled to a temperature of −150° C., using liquid nitrogen. In this state, the measurement was conducted using an impedance/grain-phase analyzer while increasing the temperature of the $BaTiO_3$-based sintered body to 120° C. at a rate of 5° C./min. The measurement results associated with dielectric constant are described in FIG. 1, and the measurement results associated with dielectric loss are described in FIG. 2.

Referring to Table 1, it can be found that a high relative density of 96% or more and a small average grain size of about 2 $\mu$m are obtained when $BaTiO_3$-based body is subjected to a pre-heat treatment in a reducing atmosphere prior to a sintering process. Where no pre-heat treatment is conducted, the resultant $BaTiO_3$-based sintered body has a relative density of 95% and an average grain size of 50 $\mu$m.

Figure 2:
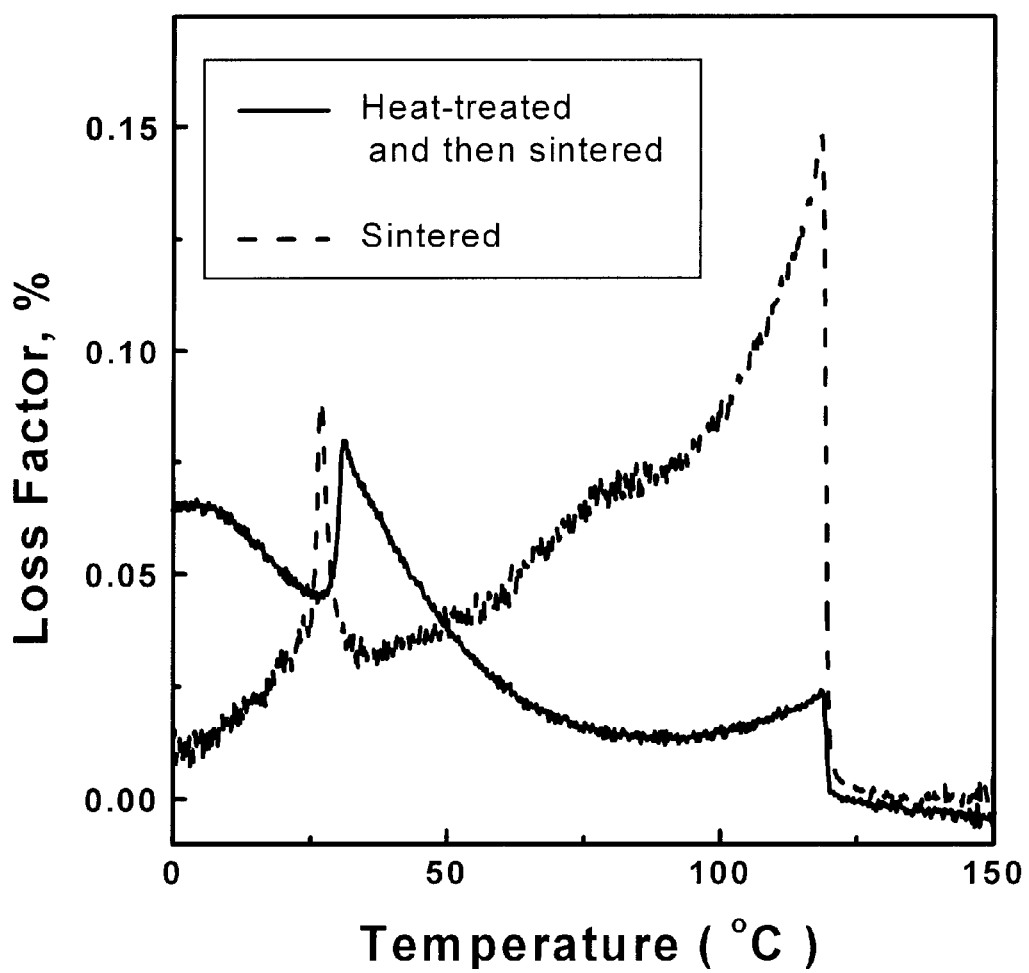
FIG. 2 is a graph depicting the dielectric loss of a dielectric made in accordance with the present invention, as compared to that of a conventional dielectric.

Referring to FIGS. 1 and 2 respectively illustrating the measurement results of two samples of Example and Comparative Example associated with dielectric constant and dielectric loss, it can be found that where no pre-heat treatment is conducted, the resultant sintered body exhibits a dielectric constant of about 2,000 and a dielectric loss of about 0.03 to 0.07 in a temperature interval of 0 to 100° C. whereas where a pre-heat treatment is conducted in accordance with the present invention, the resultant sintered body exhibits a dielectric constant of about 5,000 and a dielectric loss of about 0.02 to 0.07. That is, the $BaTiO_3$-based sintered body produced after a pre-heat treatment in a reducing atmosphere is a dielectric exhibiting superior dielectric characteristics in that it has a dielectric constant higher than that of the $BaTiO_3$-based sintered body produced without the execution of a pre-heat treatment, by about 2.5 times.

TABLE 1

Average Grain Sizes and Relative Densities of $BaTiO_3$-Based Sintered Bodies of Example and Comparative Example

| $BaTiO_3$-Based Sintered Body | Average Grain Size (μm) | Relative Density (%) |
|---|---|---|
| Example | 2.0 | 96 |
| Comparative Example | 50 | 93 |

As apparent from the above description, the present invention provides a method for making a $BaTiO_3$-based dielectric, in which a $BaTiO_3$-based body is subjected to a pre-heat treatment in a reducing atmosphere prior to a sintering process. This method is simple, as compared to conventional methods involving a hot isostatic pressing process or the addition of an additive. Accordingly, this method is suitable for practical applications. The $BaTiO_3$-based dielectric made in accordance with the present invention has a reduced average grain size and an increased relative density, as compared to $BaTiO_3$-based dielectrics made without the execution of a pre-heat treatment in a reducing atmosphere. Thus, the present invention can provide a $BaTiO_3$-based dielectric exhibiting a high dielectric constant and a low dielectric loss.

What is claimed is:

1. A method for making a $BaTiO_3$-based dielectric having an average grain size of 2.0 μm, consisting essentially of the steps of:

homogeneously mixing $BaTiO_3$ particulates with $TiO_2$ particulates to form a raw powder;

molding the raw powder into a powder compact body;

pre-heating said powder compact body at a temperature within the approximate range of 1220–1280° C. in a reducing atmosphere for a time within the approximate range of 2–15 hour for forming a pre-heated powder compact body having an approximate average grain size of 2.0 μm; and sintering the pre-heated powder compact body subjected to the pre-heat treatment.

2. The method according to claim 1, wherein the raw powder is mixed powder produced by mixing $BaTiO_3$ powder with $TiO_2$ powder, thereby producing a powder mixture, and ball-milling the powder mixture.

3. The method according to claim 1, wherein the reducing atmosphere is a hydrogen atmosphere or a mixed gas atmosphere of hydrogen and nitrogen.

4. The method according to claim 3, wherein the mixed gas atmosphere contains hydrogen in a content of at least 5 volume %.

5. The method according to claim 1, wherein the sintering is conducted in the atmosphere at a temperature of 1,320 to 1,380° C. for 2 to 48 hours.

* * * * *